United States Patent
Zoppas et al.

(10) Patent No.: US 7,163,390 B2
(45) Date of Patent: Jan. 16, 2007

(54) MACHINES AND PROCESS FOR INJECTION-MOULDING PLASTIC MATERIAL

(75) Inventors: Matteo Zoppas, Fontanafredda (IT); Pietro Gandin, Santa Lucia Di Piave (IT)

(73) Assignee: S.I.P.A. Societa' Industrializzazione Progettazione Automazione S.p.A., Sarano (IT)

( * ) Notice: Subject to any disclaimer, the term of this patent is extended or adjusted under 35 U.S.C. 154(b) by 396 days.

(21) Appl. No.: 10/496,611

(22) PCT Filed: Nov. 26, 2002

(86) PCT No.: PCT/EP02/13284

§ 371 (c)(1),
(2), (4) Date: May 25, 2004

(87) PCT Pub. No.: WO03/045662

PCT Pub. Date: Jun. 5, 2003

(65) Prior Publication Data

US 2005/0064062 A1 Mar. 24, 2005

(30) Foreign Application Priority Data

Nov. 26, 2001 (IT) .......................... RM2001A0693

(51) Int. Cl.
*B29C 45/18* (2006.01)
(52) U.S. Cl. .................. 425/528; 425/533; 425/542
(58) Field of Classification Search ................ 425/528, 425/533, 542
See application file for complete search history.

(56) References Cited

U.S. PATENT DOCUMENTS

| | | | |
|---|---|---|---|
| 3,741,704 A | 6/1973 | Beasley | |
| 4,268,241 A | 5/1981 | Rees et al. | |
| 4,380,423 A | 4/1983 | Aoki | |
| 6,245,278 B1 | 6/2001 | Lausenhammer et al. | |
| 6,413,075 B1 * | 7/2002 | Koch et al. ................ | 425/533 |
| 7,017,434 B1 * | 3/2006 | Grundmann ................ | 425/542 |
| 2001/0016239 A1 * | 8/2001 | Koch et al. ................ | 425/533 |
| 2004/0247735 A1 * | 12/2004 | Hutchinson et al. ........ | 425/533 |
| 2006/0159797 A1 * | 7/2006 | Lee et al. .................... | 425/528 |

FOREIGN PATENT DOCUMENTS

| | | |
|---|---|---|
| JP | 59081151 | 5/1984 |
| JP | 09277322 | 10/1997 |
| JP | 11254488 | 9/1999 |
| JP | 2000210992 | 8/2000 |
| JP | 2002316342 | 10/2002 |
| WO | WO 0141997 | 6/2001 |

* cited by examiner

*Primary Examiner*—Tim Heitbrink
(74) *Attorney, Agent, or Firm*—Simpson & Simpson, PLLC

(57) ABSTRACT

In the molding of parisons made of thermoplastic material for making bottles for containing effervescent beverages, resistance to bursting of the bottles is increased considerably the gasket (4) between the injector nozzle (3) and the injection cavity (1) is made of thermally insulating material and has a shape that is complementary to the shape of the cavity (1) for housing the end of the injector (3) in the injection cavity (1). Cutting of the sprue in specific conditions increases still more the resistance to bursting.

2 Claims, 1 Drawing Sheet

MACHINES AND PROCESS FOR INJECTION-MOULDING PLASTIC MATERIAL

CROSS REFERENCE TO RELATED APPLICATIONS

This application claims the benefit to International Application PCT/EP02/13284, filed 26 Nov. 2002 (English), which claims priority from Italian Application RM2001A000693, filed 26 Nov. 2001.

FIELD OF THE INVENTION

The present invention relates to an improvement in machines for injection moulding of plastic material, and to the corresponding process of implementation. In particular, it relates to a different design of the gasket for the molten material that is to be injected, i.e., of the connecting and sealing body between the head of the injection nozzle and the body of the mould or injection cavity, as well as to the use of a specific type of material for said gasket, together with the corresponding sequence of operating steps necessary for obtaining the desired product.

STATE OF THE ART

In the production by injection moulding of hollow bodies made of thermoplastic material, such as bottles, it is common practice to obtain first a parison, from which to pass, by successive processing steps, to the desired finished product. In the production of parisons, thermoplastic material (for example PET) in the molten state is injected, by means of a steel nozzle, into a cooled steel mould provided with a cavity or a plurality of cavities of appropriate shape, where it solidifies in amorphous form as it comes into contact with the cold walls of the mould. A cylindrical piston-like member, which is also made of steel and is referred to as valve rod is caused to advance up to the point where it closes the injection duct made in the wall of the injection cavity. The parison thus obtained can finally be extracted. In order to achieve high productivity and obtain a uniform flow of material to be injected, so as to prevent moulding irregularities and/or obstruction of the nozzle due to solidification of the material, or the like, the injection nozzle must have a temperature similar to that of the molten thermoplastic material, whereas the mould must undergo marked cooling in order to obtain a high rate of cooling of the injected material and hence its solidification in an amorphous form, this being necessary to achieve a good mechanical strength and transparency of the finished product.

Between the body of the mould and the injection nozzle there is set a gasket, which has a generically annular shape and which basically has the function of providing a seal to prevent the thermoplastic material from coming out of the machine. The seal inside the machine i.e., between the injection nozzle and the injection cavity, is ensured by the valve rod, which is made to advance along the duct between the nozzle and the inside of the: injection cavity, the said duct having a length corresponding to the wall thickness of the injection cavity added to the thickness of the gasket, until it bears upon the external end part of the channel for introducing molten material into the injection, cavity, by penetrating into said channel for a distance of some tenths of a millimetre. In this solution, however, the valve rod may easily jam against the gate of said channel, and the parison has attached to it, in an area corresponding to the inlet hole for introduction of the thermoplastic material into the injection cavity, a stump of plastic, referred to as sprue, which is rather long. Furthermore, the thermoplastic material that will make up the sprue is at a temperature somewhat higher than the inside of the injection cavity itself and thus solidifies more slowly into a crystalline form. When the parison is extracted from the mould, there is then obtained a body of amorphous material to which a sprue having a crystalline structure is attached. In addition, according to the above known configuration of machines for moulding parisons, the small surface of contact existing between the gasket and the mould readily leads to damage of the gasket and hence to the possibility of considerable leakage of molten thermoplastic material between the injector, the gasket and the injection cavity, as well as leakage outside the machine, and consequently leads to stoppages in production, to defects in the flow, within the injection cavity, of the molten thermoplastic material, with irregularities of solidification of the material itself (variations in thickness, opaque and crystalline zones, 'burns', etc.), and to products with irregular and filamentous sprue.

The facts outlined above lead to a number of drawbacks. In particular, the area of the sprue presents mechanical characteristics that are poorer than the rest of the parison, with possible failures occurring both during forming of the finished product and following upon use of said product, for example bottles containing effervescent beverages. The above drawback has not so far been eliminated, inasmuch as all bottles made of thermoplastic material have, at the centre of the bottom, an opaque circular zone corresponding exactly to the sprue that has solidified in a crystalline form. These bottles, in particular if they are used with very effervescent beverages, may yield both on account of warehousing temperatures that are too high and on account of even light impact, with evident repercussions on the image of the firm using them, on the firm's capacity for penetrating markets in geographical areas characterised by high temperatures, and on the levels of sale of the product.

Faced with such possibilities of failure, many firms that use bottles made of thermoplastic material are beginning to demand a product which has a resistance to bursting at pressures higher than the ones so far considered to be safe. The solutions thus far proposed (increasing the thick ness of the walls of the finished product obtained from the parisons, using materials with better mechanical characteristics, etc.) lead both to a higher cost of the product and to possible difficulties of production.

Hence, at the moment there does not exist a practical and reliable solution to the problem of mechanical strength of the finished products, and in particular bottles for containing effervescent beverages.,

DESCRIPTION OF THE INVENTION

Figure 1:
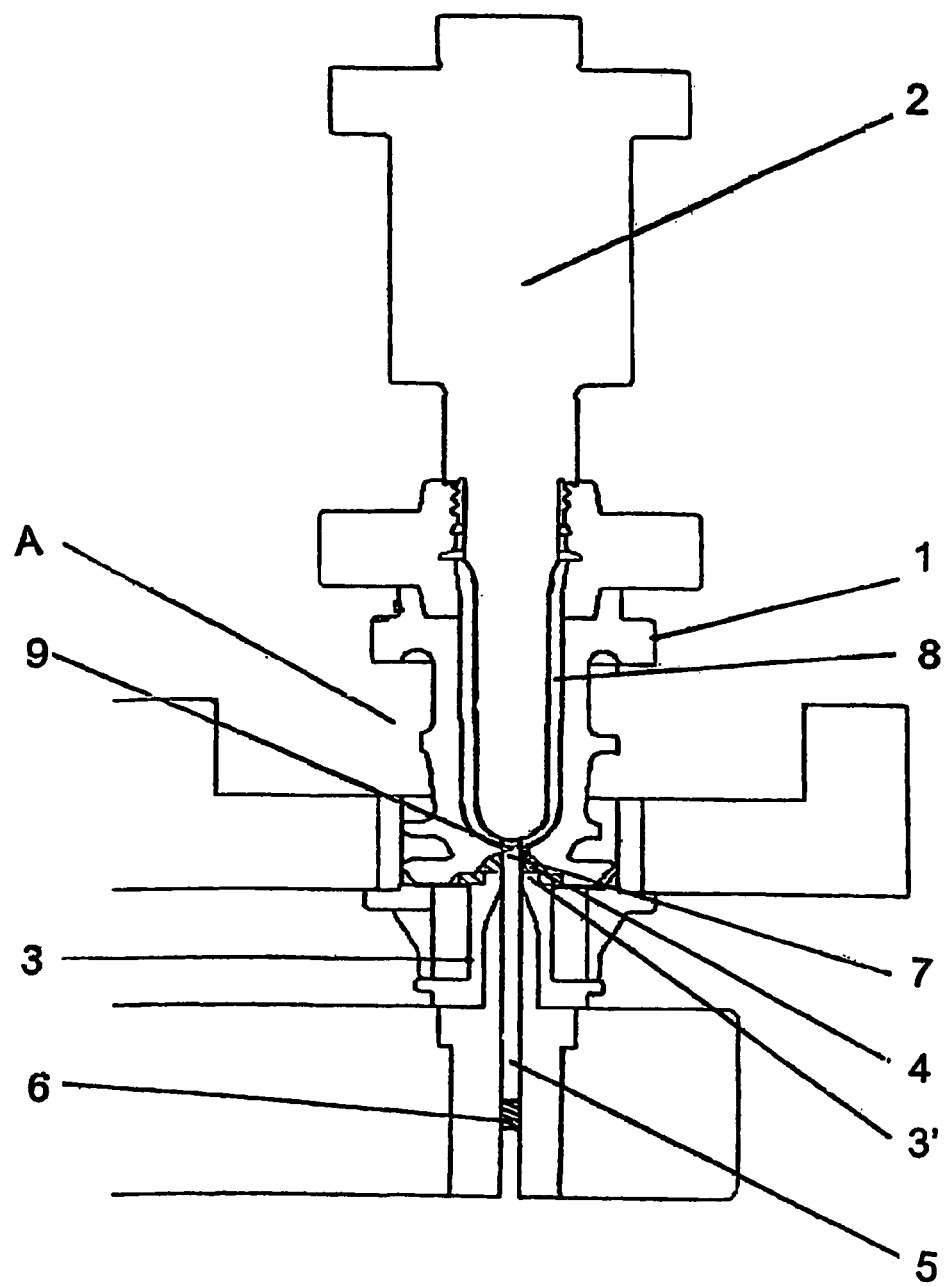
FIG. 1 represents a cross-sectional view of the injection part of the system for producing parisons.

The purpose of the present invention is to overcome the drawbacks described above by proposing an improvement to apparatuses for injection moulding of parisons, and the corresponding process of implementation.

According to the present invention, an improvement is proposed to a machine for moulding parisons made of thermoplastic material, in which the material in the molten state is injected by an injector into a injection cavity, or into a plurality of injection cavities in case the mould comprises more than only one injection cavity, through a hole made in the wall of the mould itself. In said machine, a housing is present on the bottom of the injection cavity facing the injector, a gasket being set within the housing between the injector and the injection cavity, and a valve rod is pushed, at the end of injection of molten thermoplastic material, through the injector and through the seal until the passage between the injector and the injection cavity is closed. According to the aforementioned proposed improvement, (i) the aforesaid gasket has a shape similar and complementary to the shape of the housing and is made of a thermally insulating material provided with specific mechanical characteristics, in particular as regards resistance to thermal shock and thermal expansion, and is provided with a through hole for guiding the molten thermoplastic material from the injector towards the injection cavity, the said hole being calibrated exactly to the diameter of the valve rod; and (ii) the hole made in the wall of the injection cavity for passage of the molten thermoplastic material has, throughout its length, the same diameter as that of the valve rod.

The aforesaid thermally insulating material has a coefficient of heat exchange of between 0.2 and 0.9 W/° K×m$^2$ and is preferably chosen in the group comprising materials having high thermal and mechanical characteristics, for example polyamide, polytetrafluoroethylene, and polyterketone compounds. The said material must be able to resist temperatures of between 250° C. and 500° C., have a compressive strength higher than 40 N/mm$^2$, and a coefficient of thermal expansion of between 20 and 50·10$^{-6°}$ K$^{-1}$ in a thermal range of between 60° C. and 100° C.

The new characteristics of the injection-moulding machine described above lead to the elimination, in the parison, of the crystalline zone at the point of injection into the injection cavity and to the formation of a sprue of amorphous structure. Experience has shown that it is advisable to carry out cutting of said sprue prior to forming of the finished body.

In addition, it is possible to get the valve rod to advance until it occupies the entire length of the inlet hole, made in the wall of the injection cavity, for introduction of the thermoplastic material, thus preventing formation of the sprue.

The process for producing parisons made of moulded thermoplastic material (e.g., PET) is therefore characterised in that the heat exchange between the injection nozzle and the body of the mould is reduced by interposition of a gasket having a low coefficient of heat exchange of between 0.2 and 0.9 W/° K×m$^2$, as defined above, in that the length of the sprue is adjusted by causing the valve rod to advance into a desired position inside the calibrated holes of the seal and of the injection cavity, and in that, after extraction of the parison from the mould, the sprue that is present is cut away. Cutting is performed by means of a rotating blade having a speed of rotation of not less than 5 000 r.p.m., with a cutting time higher than 0.65 s, preferably around 0.8 s.

The present invention will now be described by way of non-limiting example, with reference to a number of experimental tests (regarding the preparation of parisons for bottles for containing effervescent beverages) by means of the attached drawing, in which FIG. 1 represents a cross-sectional view of the injection part of the system for producing parisons, which incorporates the improvement according to the present invention.

With reference to FIG. 1, a system for producing parisons made of thermoplastic material comprises a forming station A, which in turn comprises a negative injection cavity 1, inside which there is inserted a core 2, in this way delimiting a gap 8, into which the thermoplastic material is to be injected. Injection is carried out using an injector 3 provided with a nozzle 3' and a longitudinal through channel 5. The distal end of said nozzle 3' is inserted into a cavity, which in the drawing has a hemispherical shape, and is made in the bottom part of the cavity block 1 and is aligned therewith, a through hole 9 being made in the wall of the cavity block 1 in communication with the gap 8 at the top part of said cavity. Sealing between the nozzle 3' and the cavity block 1 is guaranteed by a gasket 4 provided with a calibrated through calibrated hole 7. According to the invention, said gasket 4 has a shape that is similar and complementary to the shape of said cavity, which, in the drawing is hemispherical and is made in the bottom part of the mould plate 1. In this way, the entire surface of interface between the gasket and the cavity constitutes a surface of contact and sealing, thus guaranteeing a perfect seal.

In use, the thermoplastic material is injected into the gap 8 through the channel 5 of the injector 3, through the through calibrated hole 7 and through the through hole 9. Once the gap 8 has been filled, a valve rod 6 is caused to advance in the channel 5. According to the invention, the said valve rod 6 is pushed up to the gasket 4, thus entirely occupying the calibrated hole 7 made in the gasket itself, said hole being aligned with the channel 5 and with the hole 9. Furthermore, according to the invention, the valve rod 6 can be made to advance beyond this point until it occupies the hole 9 completely, thus altogether eliminating the sprue.

According to the invention, the ample surface of contact between the gasket 4 and the wall of the cavity (which in the drawing is, by way of example, hemispherical) guarantees a perfect seal, whilst the use of thermally insulating materials guarantees that the end part of the calibrated hole 7, close to the mould plate 1, will be at a temperature closer to the temperature of the walls of the mould plate 1 than to the temperature of the nozzle 3'. In addition, the valve rod 6, by advancing right within the calibrated hole 7 (or else within the hole 9) considerably reduces (or nullifies altogether) the length of the sprue (i.e., the part of injected thermoplastic material which solidifies between the head of the valve rod 6 and the external surface of he gap 8). In this way, there is guaranteed a rapid solidification in amorphous form of the entire parison, including the possible sprue.

A series of tests have been conducted, each for the production of ten parisons. The first set of tests, which served as a comparison, regarded the production of parisons according to the traditional technique. The second set of tests was aimed at establishing the optimal conditions for producing parisons, according to the present invention, for flat-bottomed bottles that are not suitable for containing strongly effervescent beverages. The third set of tests regarded the production, according to the present invention, of parisons with sprues of very small dimensions, once again for flat-bottomed bottles. Finally, the second and third sets of tests were repeated for the production of 0.26-litre bottles having rounded bottoms, which are suitable for containing effervescent beverages.

For the gasket 4, a polytetrafluoroethylene material and a polyterketone material were used, both of which had a coefficient of thermal conductivity of between 0.30 and 0.80 W/° K×m$^2$ in conformance with the standard DIN 52612.

The tests were all conducted using the same type of injected material, namely Permaclear® Akzo, D 04 300 cp.

The results obtained in the first three sets of tests (A, B, C) are given in reference to the thermographic analysis of the product during moulding, distributed over 10 levels (level 1 is at the mouth of the parison; level 10 is at the height of the sprue), as appears in Table 1. These analyses show how, in the set of tests A, there is a non-regular pattern of the temperatures, with a discrete thermal jump between levels 1–2 and level 3, an inversion between level 4 and level 5, and a particularly high temperature at the level of the sprue.

Also the set of tests B present a certain irregularity in the pattern of the temperatures, with, however, a lower temperature of the sprue.

The set of tests C presents a pattern of temperatures that is decidedly regular, with the sprue "cold".

The said data indicate that in the set of tests A there is bound to be a sprue of a crystalline structure, with the possible formation of filiform appendages of crystallized resin at the level of the sprue and on the walls of the injection cavity. In addition, the irregularity in the pattern of temperatures will be able to favour the formation of variations of thickness in the parison.

TABLE 1

| LEVEL | TEST A T ° C. | TEST B T ° C. | TEST C T ° C. |
|---|---|---|---|
| 1 | 106.0 | 111.0 | 105.8 |
| 2 | 107.1 | 113.7 | 107.1 |
| 3 | 113.3 | 118.3 | 113.6 |
| 4 | 111.2 | 113.8 | 112.0 |
| 5 | 112.1 | 113.3 | 112.4 |
| 6 | 110.2 | 113.1 | 111.8 |
| 7 | 109.0 | 114.1 | 110.3 |
| 8 | 93.6 | 112.0 | 108.1 |
| 9 | 97.9 | 103.1 | 96.6 |
| 10 | 114.6 | 106.7 | 95.7 |

The above data appear to indicate that, in the set of tests B and, above all, in the set of tests C, there should be the elimination of crystalline zones in the parison. In effect, examination of the parisons produced showed that in tests A there was crystallization of the sprue in all the products obtained, whereas, in 80% of the products there was the formation of filaments. In tests C all the products obtained were free from defects, whereas in tests B there was an intermediate situation. The bottles produced with the parisons obtained in the tests listed above, albeit having flat bottoms, i.e., having a structure that is not suitable for containing highly effervescent beverages, were subjected to bursting tests and compared to normally produced bottles for effervescent beverages. The latter bottles presented an average bursting pressure of 1.36 MPa, with a maximum pressure of 1.41 MPa., instead the bottles produced according to the present invention, albeit of the flat-bottomed type, presented maximum values of resistance to bursting of around 1.5 MPa, even though the mean value was considerably lower, around. 1.0 MPa. The results obtained, in particular in connection with the complete absence of crystalline zones in the parisons, suggested proceeding with experimentation on bottles for liquids under pressure. Also in this case, ten bottles were produced for each test to verify the effectiveness of cutting of the sprue. The results obtained are given in Table 2.

TABLE 2

| Sample No. | Without cutting of the sprue (bursting pressure, MPa) | With cutting of the sprue (bursting pressure, MPa) |
|---|---|---|
| 1 | 1.69 | 1.79 |
| 2 | 1.70 | 1.74 |
| 3 | 1.74 | 1.75 |
| 4 | 1.70 | 1.75 |
| 5 | 1.69 | 1.68 |
| 6 | 1.69 | 1.74 |
| 7 | 1.71 | 1.79 |
| 8 | 1.66 | 1.74 |
| 9 | 1.70 | 1.75 |
| 10 | 1.71 | 1.72 |
| MEAN | 1.70 | 1.75 |

Considering that the currently accepted bursting pressure for PET bottles for effervescent beverages is 1.4 MPa, it may be seen that the present invention enables an increase of 0.2–0.25 MPa in the pressure by simply modifying the gasket between the injection nozzle and the injection cavity of the parison.

The invention claimed is:

1. Apparatus for injection moulding of plastic material, comprising an injector, an injection cavity wherein molten thermoplastic material is injected by the injector into the injection cavity through a hole made in the wall of said injection cavity and further comprising a housing on the bottom of said injection cavity facing said injector, a gasket set made of a thermal insulting material, said gasket set positioned within said housing between said injector and said injection cavity, and an valve rod adapted to be pushed, at the end of injection of molten thermoplastic material, until the passage between said injector and said injection cavity is closed, said gasket having a shape similar and complementary to the shape of said housing being provided with a through hole for guiding the molten thermoplastic material from said injector towards said injection cavity, said hole being calibrated exactly to the diameter of said valve rod and the hole made in the wall of said injection cavity for passage of the molten thermoplastic material has, throughout its length, the same diameter as that of said valve rod characterised in that said thermal insulating material has the following specific thermal and mechanical characteristics, a coefficient of heat exchange of between 0.2 and 0.9 W/° K×m$^2$, a resistance to temperatures of between 250° C. and 500° C., a compressive strength higher than 40 N/mm$^2$ and a coefficient of thermal expansion of between 20 and 50·10$^{-6}$ K$^{-1}$.

2. Apparatus according to claim 1, wherein said thermal insulating material is polyamide, polytetrafluoroethylene, or a polyterketone compound.

* * * * *